March 30, 1926.
C. B. SPALSBURY
TRIMMING MACHINE
Filed Jan. 9, 1924
1,578,293
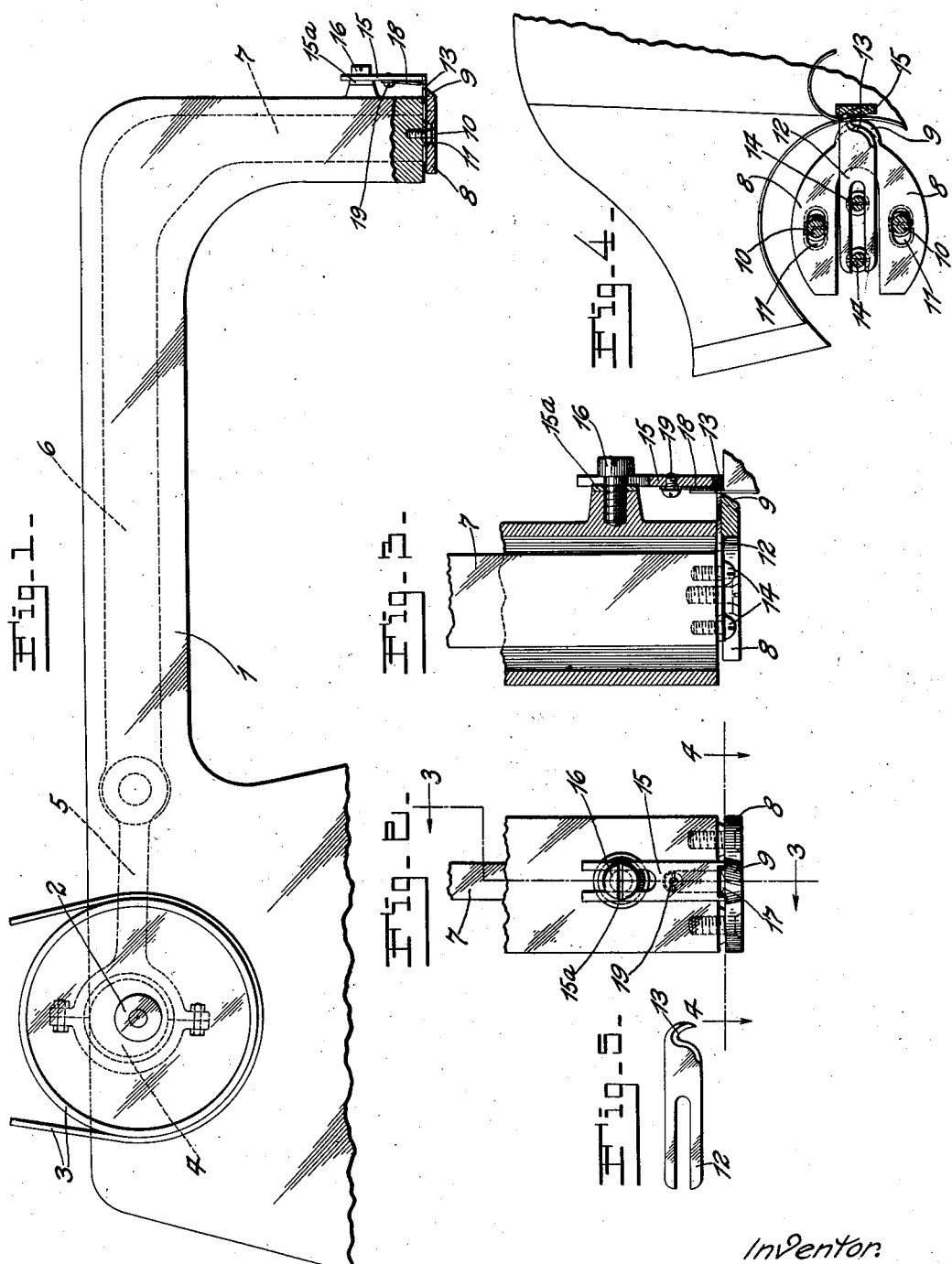
Inventor:
Charles B. Spalsbury,
by Rippey & Kingsland,
His Attorneys.

Patented Mar. 30, 1926.

1,578,293

UNITED STATES PATENT OFFICE.

CHARLES B. SPALSBURY, OF ST. LOUIS, MISSOURI, ASSIGNOR TO JOHNSON, STEPHENS AND SHINKLE SHOE COMPANY, OF ST. LOUIS, MISSOURI, A CORPORATION OF MISSOURI.

TRIMMING MACHINE.

Application filed January 9, 1924. Serial No. 685,115.

*To all whom it may concern:*

Be it known that I, CHARLES B. SPALSBURY, a citizen of the United States, residing at St. Louis, Missouri, have invented a new and useful Trimming Machine, of which the following is a specification.

This invention relates to a trimming machine.

An object of the invention is to provide an improved machine for trimming the extended portions of the facing or cover of an article rapidly and with facility, with the result that the edges are cut smooth and without damage to any portion of the article.

Another object of the invention is to provide an improved cutter and means for operating it upon the principle of a shear to perform the cutting as the cutter is drawn in a direction away from the article, thereby avoiding possibility of damage to the article and at the same time obtaining complete severance of the extended portions of the material without leaving ragged edges or protruding fibres.

Another object of the invention is to provide an improved machine of the character mentioned in which the mechanism is so designed and arranged that the article may be manipulated without difficulty, with the result that the cutting mechanism will operate to cut the extended portions of the facing or cover rapidly and smoothly and without damage to the article.

Another object of the invention is to provide a device of the character mentioned which may be readily adjusted and varied as to capacity so as to adapt it for operation upon materials of different thickness.

Other objects of the invention will appear from the following description, reference being made to the drawing in which Fig. 1 is a side elevation, with a part of the cutting mechanism shown in section, of a machine embodying one form of the present invention.

Fig. 2 is an outer end view of the cutting mechanism.

Fig. 3 is a sectional view of the cutting mechanism on the line 3—3 of Fig. 2.

Fig. 4 is a view showing the cutting devices in plan when in operation, and may be considered as viewed on the line 4—4 of Fig. 2.

Fig. 5 is a plan view of the knife detached.

The machine illustrated is designed and adapted specially for use in trimming the extended portions of the cover or facing on the breast of a shoe heel, but it will be readily understood that the machine may be easily applied to other uses. It may be used with equal advantage in trimming the extended portions of facings or covers of various articles.

The actuator for the cutting device may be of any suitable form or design, one appropriate form being shown and supported within a frame 1. As shown a shaft 2 is journaled for rotation within the frame 1 and may be rotated by a belt or pulley connection 3. An eccentric 4 is attached to the shaft 2 within the frame 1 and is operatively connected with one end of a link 5, the opposite end of which is pivoted to a knife support and actuator comprising a horizontal portion 6 and a depending portion 7, all within the frame 1. Obviously rotation of the shaft 2 will reciprocate said knife support and actuator.

A cutting block 8 having a cutting edge 9 extending therefrom is adjustably supported below the lower end of the downwardly extended portion of the frame 1 by screws 10 passing through elongated holes 11 in said block 8 and into threaded holes in the frame 1. A cutter 12 notched at its outer end to provide a knife 13 is secured to the lower end of the depending portion 7 of the support and actuator by screws 14 passing through the slot in said plate and engaging in threaded holes in the end of the actuator 7. The inner edge of the knife 13 is sharpened. The knife 13 operates close against the upper surface of the cutting edge 9 so that on each retracting movement the knife 13 cuts entirely through any material interposed between the knife and cutting edge 9. The block 8 and the knife 13 are independently adjustable in accordance with the thickness of the material to be cut, and may be removed to be sharpened or for other purposes.

A gauge guard to protect the work is adjustably supported by the frame 1. Said guard comprises a slotted plate 15 secured to the frame 1 by a screw 16 and extending downwardly to about the plane of the upper side of the cutting block 8. The lower end of the guard 15 is provided with a notch 17 of sufficient width to permit operation of the knife 13 therethrough. The guard 15 is supported so that the lower end thereof is spaced from the end of the cutting edge 9 a sufficient distance to permit insertion of the material to be cut. The guard is adjustable to the throw of the knife in accordance with the thickness of the material being cut, washers 15a being suitable to obtain proper spacing of the guard. A leaf spring 18 is secured to the inner face of the guard 15 by a screw 19. A function of the spring 18 is to press the material toward the cutting edge 9 during operation of the knife 13.

The facing or cover for the breasts of shoe heels when applied is ordinarily of greater width than the heel, so that the extended portions thereof do not conform exactly to the sides of the heel and sole. This requires that the extended portions be trimmed in order to form a finish; and heretofore it has been the usual practice to trim said extended portions of the facing or cover by hand. This makes the operation expensive and requires skilled operators in order to avoid injury to the shoe, particularly near the breast of the heel. The present invention greatly facilitates and accelerates the operation of trimming the extended portions of the facing and at the same time avoids injury to the shoe or the heel.

In operation that part of the shoe having the surplus facing or cover secured thereto is placed against the lower end of the guard 15 and the surplus portion of the facing is fed between the spring 18 and the cutting edge 9 of the cutting block. The machine being in operation the knife 13 is reciprocated rapidly, with the result that as the work is manipulated properly to pass the extended portion of the facing between the spring 18 and the cutting edge 9 the facing is smoothly cut throughout the length of and close to the shoe. The guard 15 prevents the knife 13 from cutting or defacing the heel or the shoe.

From the foregoing it will be seen that my invention obtains all of its intended objects in a highly efficient and satisfactory manner. While special reference has been made to the use of the machine for trimming the facing of the breast of shoe heels, it is obvious that the machine may be applied to various other uses, and I do not restrict myself in this respect. The machine may be manufactured and operated economically and by its use an operator may trim a much greater number of articles in a given period of time than by the slower and less satisfactory manual processes of trimming now usually employed. Thus the cost of the trimming operations herein described is very largely reduced and this is accomplished without increase in the number of shoes damaged in the trimming operations, for the guard 15 prevents any injury to the shoe or to the heel cover.

I am aware that the form and arrangement of the parts comprising the invention may be varied within equivalent limits without departure from the nature and principle of the invention. I contemplate such variations as may be found useful or expedient to obtain best results from the use of the invention, and do not restrict myself unessentially in any particular but what I claim and desire to secure by Letters Patent is:—

1. A trimming machine comprising a downwardly extending frame part, a stationary cutting block secured to the lower end of the frame part and having an extended cutting edge, an actuator extending downwardly toward and terminating above said block, a knife attached to said actuator between said cutting block and said frame part, and mechanism for operating said actuator to impart horizontal reciprocating movements to said knife.

2. A trimming machine, comprising a downwardly extending frame part, a stationary cutting block secured to the lower end of the frame part and having an extended cutting edge, a knife supported for horizontal reciprocating movements above said block and arranged to cut during movement toward the cutting edge from a position beyond the cutting edge, mechanism for imparting horizontal reciprocating movements to said knife, and means for protecting a shoe heel and shoe when the protruding edges of the facing or cover are passed against the outer end of said cutting edge for severance by said knife.

3. A trimming machine, comprising a downwardly extending frame part, a stationary cutting block secured to the lower end of the frame part and having an extended cutting edge, a plate supported for horizontal reciprocating movements above said block, a knife comprising a hook on the end of said plate having a cutting edge on its inner side for cooperation with said extended cutting edge and arranged to cut during movement toward the extended cutting edge, and mechanism for imparting horizontal reciprocating movements to said plate and knife.

4. A trimming machine, comprising a downwardly extending frame part, a stationary cutting block secured to the lower end of the frame part and having an extended cutting edge, a plate supported for horizontal reciprocating movements above said block, a knife comprising a hook on the end of said plate having a cutting edge on its inner side for cooperation with said extended cutting edge and arranged to cut during movement toward the extended cutting edge, mechanism for imparting horizontal reciprocating movements to said plate and knife, and means for protecting an article when the protruding edges of the facing or cover of the article are passed between said hook-knife and the outer end of said extended cutting edge.

5. A trimming machine, comprising a downwardly extending frame part, a stationary cutting block secured to the lower end of said frame part and having an extended cutting edge, a knife supported for horizontal reciprocating movements above said block, and mechanism for imparting horizontal reciprocating movements to said knife to project the cutting edge of said knife beyond the cutting edge on said block and to retract the cutting edge of said knife across the cutting edge of said block.

6. A trimming machine, comprising a downwardly extending frame part, a stationary cutting block secured to the lower end of said frame part and having an extended cutting edge, a knife supported for horizontal reciprocating movements above said block, mechanism for imparting horizontal reciprocating movements to said knife to project the cutting edge of said knife beyond the cutting edge on said block and to retract the cutting edge of said knife across the cutting edge of said block, and a guard for protecting an article when the protruding edges of the facing or cover of the article are passed between said knife and said extended cutting edge for severance during retracted movement of said knife.

7. A trimming machine comprising a downwardly extended frame part, a horizontal cutting block attached to the lower end of said frame part and having a cutting edge extending beyond said frame part, a guard for protecting an article when the protruding edges of a facing or cover are passed between said guard and said cutting edge, a downwardly extending actuator terminating above said cutting block, a knife attached to said actuator between said cutting block and said frame part, and mechanism for operating said actuator and thereby said knife to trim the protruding edges of the facing or cover of the article as said facing or cover is passed between said knife and said cutting edge.

8. A cutting machine comprising a stationary cutting block having a cutting edge at one end thereof, a support extending toward and transversely of the axis of said block, a knife attached to said support for reciprocating movements above said block and arranged to cut during retraction from a position beyond said block, and mechanism for reciprocating said support to impart said horizontal reciprocating movements to said knife while said knife maintains constant contact with said block.

9. A trimming machine, comprising a stationary cutting block having a cutting edge at one end thereof, a knife supported for horizontal reciprocating movements above said block and arranged to cut during retraction to a position above said block from a position beyond said block, mechanism for operating said knife, and a guard for protecting a shoe heel and shoe when the protruding edges of the facing or cover are passed between said knife and the outer end of said cutting edge for severance by retracted movement of said knife.

10. A trimming machine, comprising a stationary frame having a downwardly extending frame part, a stationary block secured to the lower end of the frame part and having an extended cutting edge, a hook knife supported for horizontal reciprocating movements above said block and arranged to cut during movement toward the cutting edge from a position beyond the cutting edge, means for protecting an article when passing the protruding edges or a facing or cover between said hook and said cutting edge, and mechanism for imparting movements to said knife to cut the facing or cover during movement of the hook toward the cutting edge.

11. A machine of the character described, comprising a stationary downwardly extending frame part, a stationary cutting block secured to the lower end of the frame part and having an extended cutting edge, a reciprocating actuator within the frame terminating above said cutting block, a plate secured to said actuator above said cutting block and having a hook at its outer end with a knife edge on the inner edge of the hook and arranged to move outwardly a distance sufficient to receive the material to be trimmed within the hook and adjacent to the outer end of said cutting block, whereby the material will be trimmed during retracted movement of said hook.

12. A machine of the character described, comprising a stationary downwardly extending frame part, a stationary cutting block secured to the lower end of the frame part and having an extended cutting edge, a reciprocating actuator within the frame terminating above said cutting block, a plate secured to said actuator above said cutting block and having a hook at its outer end with a knife edge on the inner edge of the hook and arranged to move outwardly a distance sufficient to receive the material to be trimmed within the hook and adjacent to the outer end of said cutting block, whereby the material will be trimmed during retracted movement of said hook, and a guard for protecting a shoe heel and shoe when the protruding edges of the facing or cover are passed within said hook and against the outer end of said cutting edge for severance during retracted movement of said hook.

13. A machine of the character described, comprising a stationary downwardly extending frame part, a stationary cutting block secured to the lower end of the frame part and having an extended cutting edge, a reciprocating actuator within the frame terminating above said cutting block, a plate secured to said actuator above said cutting block, a hook on the outer end of said plate having a knife edge on its inner side and arranged to move outwardly a distance sufficient to receive the material to be trimmed within the hook, whereby the material will be trimmed during retracted movement of said hook, a guard for protecting a shoe heel and shoe when the protruding edges of the facing or cover are passed within said hook and against the outer end of said cutting edge for severance during retracted movement of said hook, and a spring for pressing the facing or cover toward said cutting edge.

14. A machine of the character described, comprising a downwardly extending frame part, a cutting block, means for supporting the cutting block rigidly in selected adjusted positions at the lower end of the frame part, an actuator in the frame part and having one end near said block, a knife, and means for securing the knife to and transversely of the axis of the actuator and in different selected positions for cooperation with said cutting block.

15. A machine of the character described, comprising a downwardly extending frame part, a cutting block, means for securing the cutting block to the lower end of said frame part in different selected adjusted positions, an actuator in said frame part, a plate, means for securing said plate to said actuator in different selected adjustments, a hook at the outer end of said plate having a cutting edge on its inner side for cooperation with said cutting block, and means for operating said actuator.

16. A machine of the character described, comprising a downwardly extending frame part, a cutting block, means for securing the cutting block to the lower end of said frame part in different selected adjusted positions, an actuator in said frame part, a plate, means for securing said plate to said actuator in different selected adjustments, a hook at the outer end of said plate having a cutting edge on its inner side for cooperation with said cutting block, means for operating said actuator, and a guard for protecting a shoe heel and shoe when the protruding edges of the facing or cover are passed within said hook and against the outer edge of said cutting block for severance during retracted movement of said hook.

17. A machine of the character described, comprising a downwardly extending frame part, a cutting block, means for securing the cutting block to the lower end of said frame part in different selected adjusted positions, an actuator in said frame part, a plate, means for securing said plate to said actuator in different selected adjustments, a hook at the outer end of said plate having a cutting edge on its inner side for co-operation with said cutting block, means for operating said actuator, a guard for protecting a shoe heel or shoe, or other article when the protruding edges of the facing or cover are passed within said hook and against the outer edge of said cutting block for severance during retracted movement of said hook, and a spring for pressing the facing or cover toward the outer end of said cutting block.

18. A trimming machine, comprising a stationary cutting block having a cutting edge, a plate supported for reciprocating movements adjacent to said block, a knife comprising a hook on the end of said plate having a cutting edge on the inner edge of its outer arm for cooperation with said first named cutting edge, and a guard having a space in such relationship to said knife that the knife enters the space but does not pass beyond the outer edge of the guard on outward throw of the knife, said elements being in a relationship such that the extended edge of the material can be properly trimmed adjacent to shoulders, corners and indentations.

19. A trimming machine, comprising a stationary cutting element and a movable cutting element, in combination with a guard for protecting the work during the trimming operation, and a spring on the guard for pressing toward the stationary cutting element the material being trimmed.

20. A trimming machine, comprising a stationary cutting element and a movable cutting element, in combination with a guard for protecting the work during the trimming operation, and a spring on the guard for pressing toward the stationary cutting element the material being trimmed, said elements being in a relationship such that the extended edge of the material can be properly trimmed adjacent to shoulders, corners and indentations.

21. A trimming machine, comprising a stationary cutting element and a movable cutting element cooperating with the stationary cutting element to trim the material, in combination with a guard for protecting the article during the trimming operation, means for supporting the guard in different adjusted positions according to the thickness of the material being trimmed, and a spring for pressing the material being trimmed toward the stationary cutting element.

22. A trimming machine, comprising a stationary cutting element and a movable cutting element cooperating with the stationary cutting element to trim the material, in combination with a guard for protecting the article during the trimming operation, means for supporting the guard in different adjusted positions according to the thickness of the material being trimmed, and a spring for pressing the material being trimmed toward the stationary cutting element, said elements being in a relationship such that the extended edge of the material can be properly trimmed adjacent to shoulders, corners and indentations.

23. A trimming machine, comprising a stationary cutting element, means for supporting said element in selected adjusted positions, a reciprocating cutting element, means for supporting the reciprocating element in selected adjustments relative to the stationary cutting element to trim materials of different thickness, a guard protecting the article during trimming operation, means for supporting the guard in different adjusted positions according to the throw of the reciprocating cutting element and in conformity with the thickness of the material being trimmed, and a spring supported by said guard for pressing the material toward the stationary cutting element.

24. A trimming machine, comprising a stationary cutting block, a knife, means for supporting the knife in different adjusted positions to trim materials of different thickness, a spring for pressing the material toward said cutting block, and means for supporting the spring in different adjusted positions corresponding to the thickness of the material being trimmed.

25. A trimming machine, comprising a stationary cutting block, a knife, a spring for pressing the material toward said cutting block, a guard for protecting the article, and means for supporting the guard in different adjusted positions according to the amount of the protruding edge to be left on the article being trimmed.

26. A trimming machine, comprising a stationary cutting block, a knife, a spring for pressing the material toward said cuting block, a guard for protecting the article, and means for supporting the guard in different adjusted positions according to the amount of the protruding edge to be left on the article being trimmed and corresponding to the thickness of the material being trimmed.

CHARLES B. SPALSBURY.